United States Patent
Furutani et al.

(10) Patent No.: US 11,285,797 B2
(45) Date of Patent: Mar. 29, 2022

(54) SIDE PART STRUCTURE OF ENGINE

(71) Applicant: Mazda Motor Corporation, Hiroshima (JP)

(72) Inventors: Masayuki Furutani, Aki-gun (JP); Akira Noomo, Aki-gun (JP); Yuta Morinaga, Aki-gun (JP); Masahiko Tanisho, Aki-gun (JP); Tsuyoshi Kouno, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 20 days.

(21) Appl. No.: 17/018,085

(22) Filed: Sep. 11, 2020

(65) Prior Publication Data
US 2021/0086603 A1 Mar. 25, 2021

(30) Foreign Application Priority Data

Sep. 20, 2019 (JP) ............................. JP2019-171777

(51) Int. Cl.
*B60K 5/02* (2006.01)
*F02B 29/04* (2006.01)
*F02B 63/04* (2006.01)
*F02M 37/00* (2006.01)
*F02M 35/10* (2006.01)

(52) U.S. Cl.
CPC ............ *B60K 5/02* (2013.01); *F02B 29/0443* (2013.01); *F02B 29/0475* (2013.01); *F02B 63/042* (2013.01); *F02M 35/10157* (2013.01); *F02M 35/10295* (2013.01); *F02M 37/007* (2013.01)

(58) Field of Classification Search
CPC ......... B60K 5/02; B60K 5/12; F02B 29/0475; F02B 63/042; F02B 29/0443; F02B 29/0437; F02B 29/0462; F02M 35/10295; F02M 37/007; F02M 35/10157; F02M 35/10327

See application file for complete search history.

(56) References Cited

U.S. PATENT DOCUMENTS

| 4,137,888 A * | 2/1979 | Allan ..................... F02B 77/13 123/198 E |
| 8,826,661 B2* | 9/2014 | Takahata ............... F02B 39/005 60/605.3 |
| 2019/0145296 A1* | 5/2019 | Kimura ................. F02B 39/14 60/605.3 |

FOREIGN PATENT DOCUMENTS

JP          2014163290 A      9/2014

* cited by examiner

*Primary Examiner* — Syed O Hasan
(74) *Attorney, Agent, or Firm* — Alleman Hall Creasman & Tuttle LLP

(57) ABSTRACT

A side part structure of an engine having cylinders lined up in a front-and-rear direction of a vehicle body, is provided. The structure includes auxiliary machinery disposed in a front part of one side wall part of the engine in a vehicle width direction, a fuel system component disposed in a rear part of the side wall part, an intercooler disposed between the auxiliary machinery and the fuel system component, and a first protector member disposed between the intercooler and the fuel system component. At least a front part of the first protector member is formed so as to be separated from the side wall part as it extends rearward. A front part of the intercooler is disposed rearward of the auxiliary machinery and the intercooler is disposed along the first protector member so as to be separated from the side wall part as it extends rearward.

11 Claims, 12 Drawing Sheets

SIDE PART STRUCTURE OF ENGINE

TECHNICAL FIELD

The present disclosure relates to a side part structure of an engine, and particularly to a side part structure of the engine in which auxiliary machinery and a fuel system component are disposed in one side wall part of the engine.

BACKGROUND OF THE DISCLOSURE

Conventionally, it is known that a direct injection engine directly injects fuel from an injector which faces a combustion chamber of the engine in a vehicle, such as an automobile. In an in-line direct injection engine in which a plurality of cylinders are provided in a row, a high-pressure fuel pump supplies high-pressure fuel through a fuel rail to a plurality of injectors corresponding to the plurality of cylinders. The high-pressure fuel pump which is one of the fuel system components is provided with a cam shaft having a pump cam, and a plunger which is reciprocated by the pump cam, and the cam shaft is rotated by a cam shaft provided to a cylinder head of the engine. Therefore, the high-pressure fuel pump is normally disposed in an upper part of a side wall part of the engine, close to the cam shaft.

Since the side wall part of the cylinder block is provided with various auxiliary machinery, such as an alternator, and the cylinder head above the cylinder block is provided with an intake manifold and an exhaust manifold, the fuel pump may interfere with accessories, such as the auxiliary machinery, in a vehicle collision. JP2014-163290A discloses an internal combustion engine of a vehicle, which includes a high-pressure fuel pump disposed in an upper part of a cylinder head, and an intercooler fixed to an intake manifold through a bracket. The intercooler is disposed forward and upward of the high-pressure fuel pump, and a rearward movement of a collided object (i.e., accessories) is prevented in a vehicle collision by a contact with the intercooler.

Meanwhile, when the in-series multiple cylinder engine is mounted in an engine bay in a front part of the vehicle body, the engine may be disposed longitudinally so that the cylinder lined-up direction may be oriented in the front-and-rear direction. Since such a longitudinal engine has superiority in that the left and right weights can be easily balanced without concentrating power mechanisms on the front axle, a torque steer is less likely to be generated because of the lateral length of the drive shafts are equal, and measures to the vibration and oscillation of a power plant including the engine are easy, it tends to be particularly adopted to large-sized engines.

When the high-pressure fuel pump described above is mounted on the longitudinal engine, the fuel pump is disposed in a rear part of the side wall part of the engine to shorten fuel piping connecting the fuel tank disposed in the rear part of the vehicle body to the fuel pump, and therefore, a pressure loss of fuel which flows inside the fuel piping can be reduced when feeding the fuel. Moreover, since the engine body itself prevents an obstacle from entering into the vehicle in a vehicle collision, particularly in a full-wrap head-on collision, it is also possible to avoid interference of the fuel pump with the accessory, such as the auxiliary machinery. However, depending on the collision mode of the vehicle, the fuel pump may still be damaged by the interference with various auxiliary machinery, such as the alternator, in the vehicle collision.

When the fuel pump is disposed in the rear part of the side wall part of the engine, various auxiliary machinery is disposed in the opposite part, a front part of the side wall part to avoid the rear part where the fuel pump is disposed. Then, in collision modes other than the full-wrap head-on collision, for example, in an offset head-on collision and a head-on pole collision, the obstacle may collide only with the auxiliary machinery while avoiding the engine body, from outside in the vehicle width direction, and the auxiliary machinery which is moved rearward by the collision with the obstacle may interfere with the fuel pump.

On the other hand, like the art of JP2014-163290A, it is possible to dispose an intercooler corresponding to a protection barrier between the auxiliary machinery and the fuel pump in order to prevent the rearward movement of the auxiliary machinery in the vehicle collision. However, although when the collision energy is relatively small, it is possible to prevent the rearward movement of the auxiliary machinery by the intercooler fixed to the engine body, when the collision energy is large, the fixed state of the intercooler is canceled (broken) by the rearward-movement force (rearward propelling force) of the auxiliary machinery, and therefore, the intercooler which is pushed by the auxiliary machinery and moved rearward may interfere with the fuel pump. That is, it is necessary to further improve the collision safety of the fuel system components.

SUMMARY OF THE DISCLOSURE

One purpose of the present disclosure is to provide a side part structure of an engine, which is capable of improving the collision safety of a fuel system component.

According to one aspect of the present disclosure, a side part structure of an engine having cylinders lined up in a front-and-rear direction of a vehicle body, is provided. The structure includes auxiliary machinery disposed in a front part of one side wall part of the engine in a vehicle width direction, a fuel system component disposed in a rear part of the side wall part, an intercooler disposed between the auxiliary machinery and the fuel system component, and a first protector member disposed between the intercooler and the fuel system component. At least a front part of the first protector member is formed so as to be separated from the side wall part as it extends rearward. A front part of the intercooler is disposed rearward of the auxiliary machinery and the intercooler is disposed along the first protector member so as to be separated from the side wall part as it extends rearward.

According to this configuration, since the intercooler is disposed between the auxiliary machinery and the fuel system component, the intercooler can be compactly disposed between the auxiliary machinery and the fuel system component, and the rearward movement of the auxiliary machinery can be prevented by the intercooler in a vehicle collision. Since the first protector member is disposed between the intercooler and the fuel system component, at least the front part of the first protector member is formed so as to be separated from the side wall part as it extends rearward, and the intercooler is disposed so that its front part is disposed rearward of the auxiliary machinery, and is disposed along the first protector member so as to be separated from the side wall part as it extends rearward, the intercooler can be guided outside in the vehicle width direction so as to be separated from the fuel system component along the first protector member when the intercooler moves rearward in connection with the rearward movement of the auxiliary machinery during the vehicle collision, thereby avoiding the interference of the intercooler with the fuel system component.

The auxiliary machinery may be disposed so as to at least partially overlap with the fuel system component, when seen in a cylinder lined-up direction. According to this configuration, the interference of the fuel system component with the other members (the auxiliary machinery or the intercooler) can be avoided even if the auxiliary machinery and the fuel system component are in the spatial relationship in which they at least partially overlap with each other in the front view.

The side part structure may further include a surge tank provided above the intercooler and configured to store intake air of the engine, and a communicating part communicating one side of the surge tank in the vehicle width direction with a lower part of the intercooler. The communicating part may be disposed so as to pass through outside the auxiliary machinery on the one side in the vehicle width direction. According to this configuration, the interference of the auxiliary machinery with the communicating part can be avoided when the auxiliary machinery moves rearward, thereby avoiding damage to the surge tank resulting from the rearward movement of the auxiliary machinery.

The side part structure may further include a fuel feeding pipe extending along the side wall part in the front-and-rear direction, and a second protector member covering at least a part of the fuel feeding pipe on the intercooler side. According to this configuration, the interference of the fuel feeding pipe with the intercooler can be avoided when the intercooler moves rearward.

The second protector member may have a front-end protecting part disposed forward of a front end part of the fuel feeding pipe. According to this configuration, damage to the front end part of the fuel feeding pipe can be avoided.

A rear end part of the second protector member may extend rearward of a part of the intercooler closest to the side wall. According to this configuration, interference of the fuel feeding pipe with the intercooler when the intercooler moves rearward can be certainly avoided.

The auxiliary machinery may be an alternator and the fuel system component may be a fuel pump. According to this configuration, both interference of the alternator with the fuel pump and interference of the intercooler with the fuel pump in the vehicle collision can be avoided.

BRIEF DESCRIPTION OF DRAWINGS

FIG. 14A illustrates a collision initial state, FIG. 14B illustrates a collision intermediate state, and FIG. 14C illustrates a collision later state.

DETAILED DESCRIPTION OF THE DISCLOSURE

Figure 1:
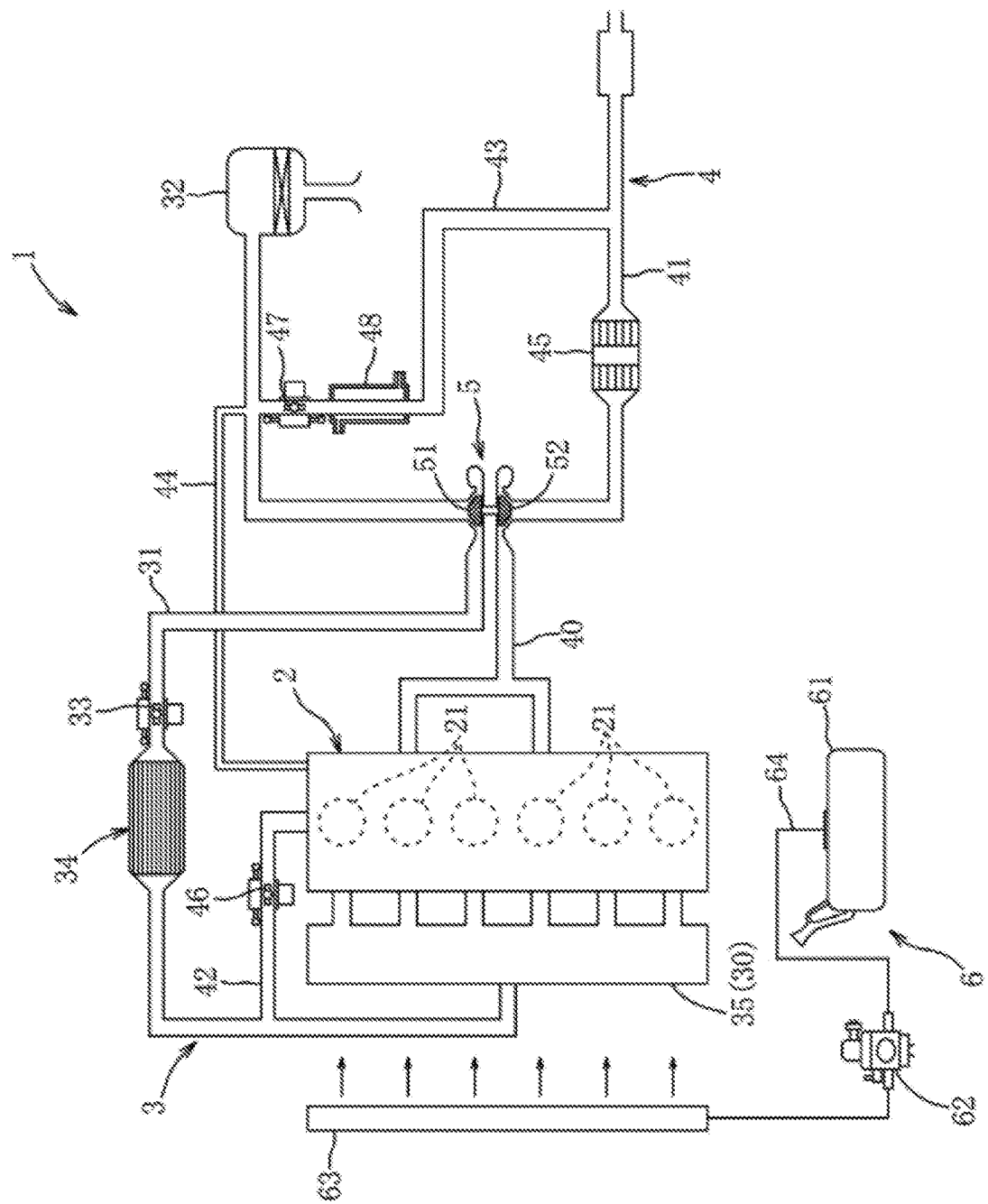
FIG. 1 is a block diagram schematically illustrating an engine according to one embodiment.
Figure 2:
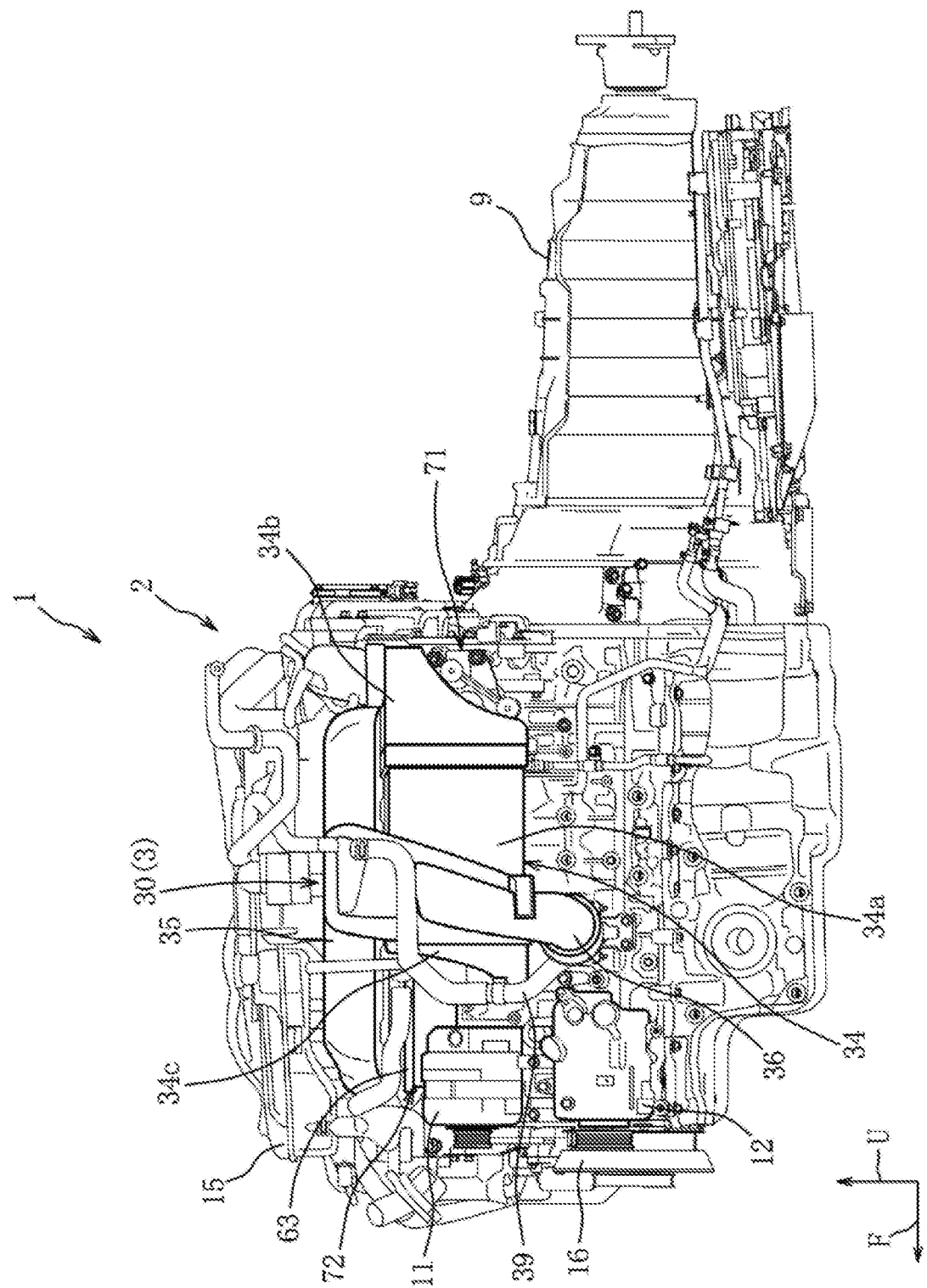
FIG. 2 is a side view of the engine.

Hereinafter, one embodiment of the present disclosure is described in detail with reference to the accompanying drawings. In the following description, the present disclosure is applied to an engine for vehicles, but the present disclosure is not limited in its application and usage. Below, in the drawings, a direction of an arrow F is forward in a front-and-rear direction, a direction of an arrow L is leftward in a vehicle width direction, and a direction of an arrow U is upward in a vertical direction, with respect to the vehicle body.

Below, one embodiment of the present disclosure is illustrated with reference to FIGS. 1 to 14. First, an outline structure of an engine 1 according to the present disclosure is illustrated with reference to FIG. 1. The engine 1 is a gasoline engine (particularly, four-stroke internal combustion engine) mounted on a vehicle with four wheels. This engine 1 is an in-line six-cylinder longitudinal engine which has six cylinders 21 disposed in a row and the lined-up direction of the cylinders 21 is oriented in the front-and-rear direction of a vehicle body.

As illustrated in FIG. 1, the engine 1 includes an engine body 2, an intake system 3, an exhaust system 4, a turbocharger 5, and a fuel feed system 6. The intake system 3 has an intake passage 31 connected to an intake port of the engine body 2. An air cleaner 32 is provided to an upstream end of the intake passage 31, and fresh air is drawn in through the air cleaner 32 into the intake passage 31. The intake passage 31 is provided with a compressor 51 of the turbocharger 5, a throttle valve 33, an intercooler 34, and a surge tank 35.

Intake air flowing through the intake passage 31 is boosted by the compressor 51, and is sent to the intercooler 34 after passing through the throttle valve 33. The intercooler 34 cools the intake air which is heated by the compression of the compressor 51. The throttle valve 33 is fundamentally maintained at a fully-open state or near the fully-open state during operation of the engine 1. Then, it is closed only when required, such as when stopping the engine 1. The surge tank 35 made of synthetic resin is formed so as to have a given volume chamber near a connection between the intake port and the intake passage 31, and it averages an intake air amount supplied to a combustion chamber of each cylinder. This surge tank 35 integrally forms a communicating part 36 corresponding to an upstream collecting passage, and a connecting path corresponding to a downstream passage and connected to the intake port of each cylinder 21, and these constitute an intake manifold 30 as an integral structure.

As illustrated in FIG. 1, the exhaust system 4 has an exhaust passage 41 of which an upstream end is connected to an exhaust manifold 40, a first exhaust gas recirculation (EGR) passage 42, a second EGR passage 43, and a blowby-gas passage 44. The exhaust manifold 40 collects exhaust ports of the three cylinders at one of the left and right sides, and exhaust ports of the three cylinders at the other side, respectively, and collects the collected exhaust gas on both sides and connects it to a part where a turbine 52 of the turbocharger 5 is provided. A catalytic converter 45 comprised of a three-way catalyst is provided to an intermediate part of the exhaust passage 41.

The first EGR passage 42 supplies relatively hot EGR gas to the intake system to increase ignitability and reduce pumping loss. The first EGR passage 42 connects a cylinder head of the engine body 2 to the intake passage 31, and is provided with an EGR valve 46 at intermediate locations thereof. The second EGR passage 43 supplies relatively low-temperature EGR gas to the intake system to reduce a $NO_x$ generation amount by lowering combustion temperature. The second EGR passage 43 connects the exhaust passage 41 to the intake passage 31, and is provided with an EGR valve 47 and an EGR cooler 48 at intermediate locations thereof. The blowby-gas passage 44 connects the inside of a head cover of the engine body 2 to the intake passage 31 to return blowby gas generated inside the engine body 2 to the intake passage 31.

The turbocharger 5 is a VG (Variable Geometry) turbocharger, which is provided with a plurality of movable vanes (not illustrated) which is changeable of its angle to adjust a flow velocity of exhaust gas flowing into the turbine 52, thereby controlling a boosting state. As illustrated in FIG. 1, the fuel feed system 6 includes a fuel tank 61 mounted on a rear part of the vehicle body, a high-pressure fuel pump 62 connected with the fuel tank 61 through a fuel piping 64, and a fuel rail 63 (fuel feeding pipe) which distributes fuel pressurized by the fuel pump 62 to the combustion chambers of the cylinders.

Next, an appearance and a structure of the engine body 2 are described. As illustrated in FIGS. 2 to 9, a left side wall part of the engine body 2 is provided with the intercooler 34 disposed at an intermediate location in the front-and-rear direction and at an intermediate location in the vertical direction, the fuel pump 62 disposed rearward of the intercooler 34, the fuel rail 63 disposed above the intercooler 34, an alternator 11 disposed forward of the intercooler 34 and at an intermediate location in the vertical direction, a first protector 71 which protects the fuel pump 62, and a second protector 72 which protects the fuel rail 63.

Figure 3:
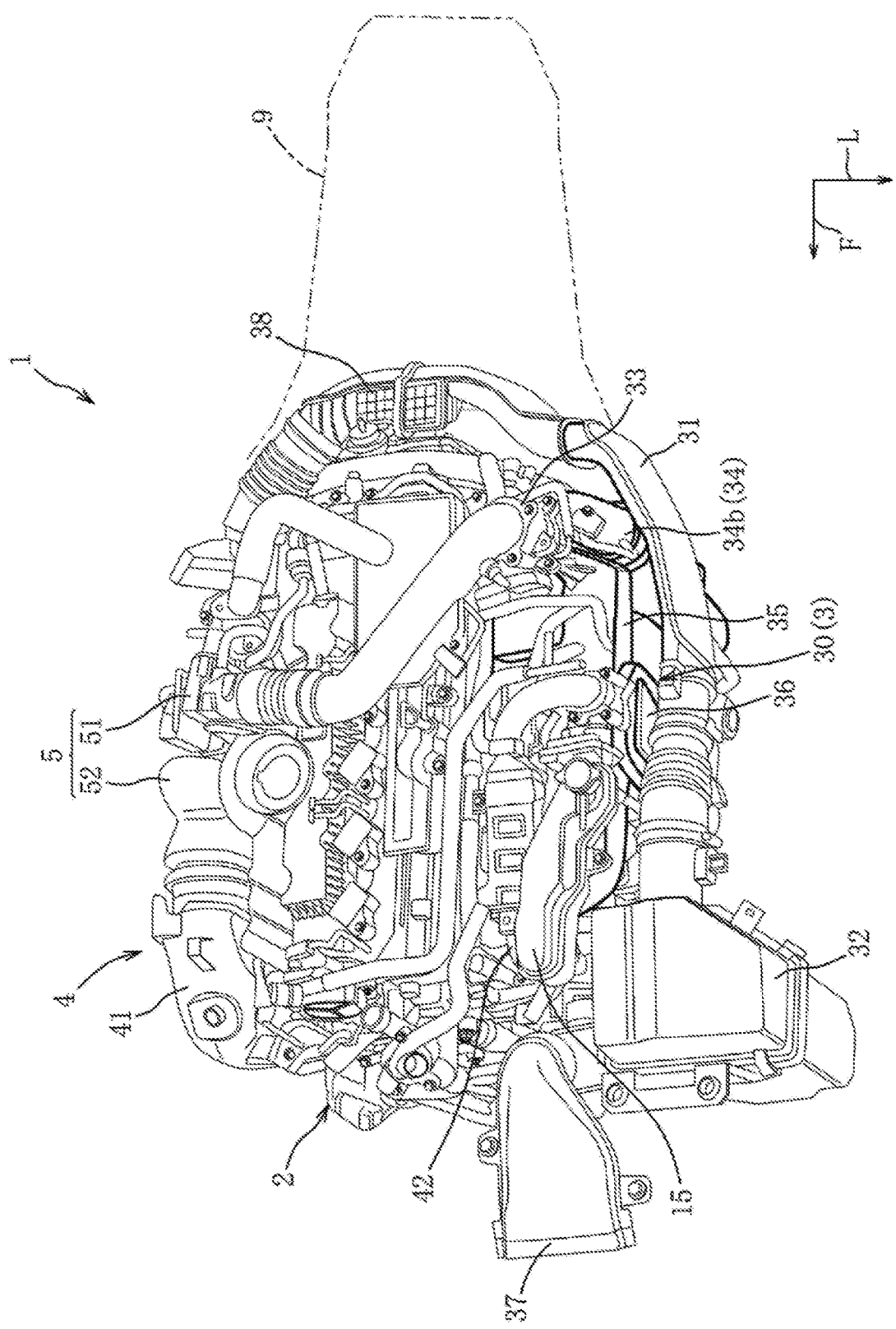
FIG. 3 is a plan view of the engine.

Intake air introduced from an intake duct 37 provided forward and leftward of the engine body 2 is sent to the air cleaner 32 installed at the left side of a front end and an upper location of the engine body 2. As illustrated in FIG. 3, the intake passage 31 extends rearward in an area near the left side of the engine body 2 (intake side). The intake passage 31 turns around rearward of the engine body 2 and above a transmission 9, extends from the rear of the engine body 2 to an area near the right side of the engine body 2 (exhaust side), and is connected to the turbocharger 5 (compressor 51). An intake silencer 38 is attached to a rear part of the intake passage 31.

As illustrated in FIG. 3, the intake passage 31 extends from the compressor 51 of the turbocharger 5 to an area near the left side of the engine body 2, passing through above the engine body 2. Intake air which became high density by the compression of the compressor 51 is sent to the intercooler 34. The intercooler 34 cools intake air of which the temperature is raised by compression of the compressor 51, by a heat exchange between the hot intake air with coolant supplied from a cooling water pump (not illustrated) through a coolant passage 39. Note that element "15" in the drawings is a subtank for the intercooler 34.

Figure 4:
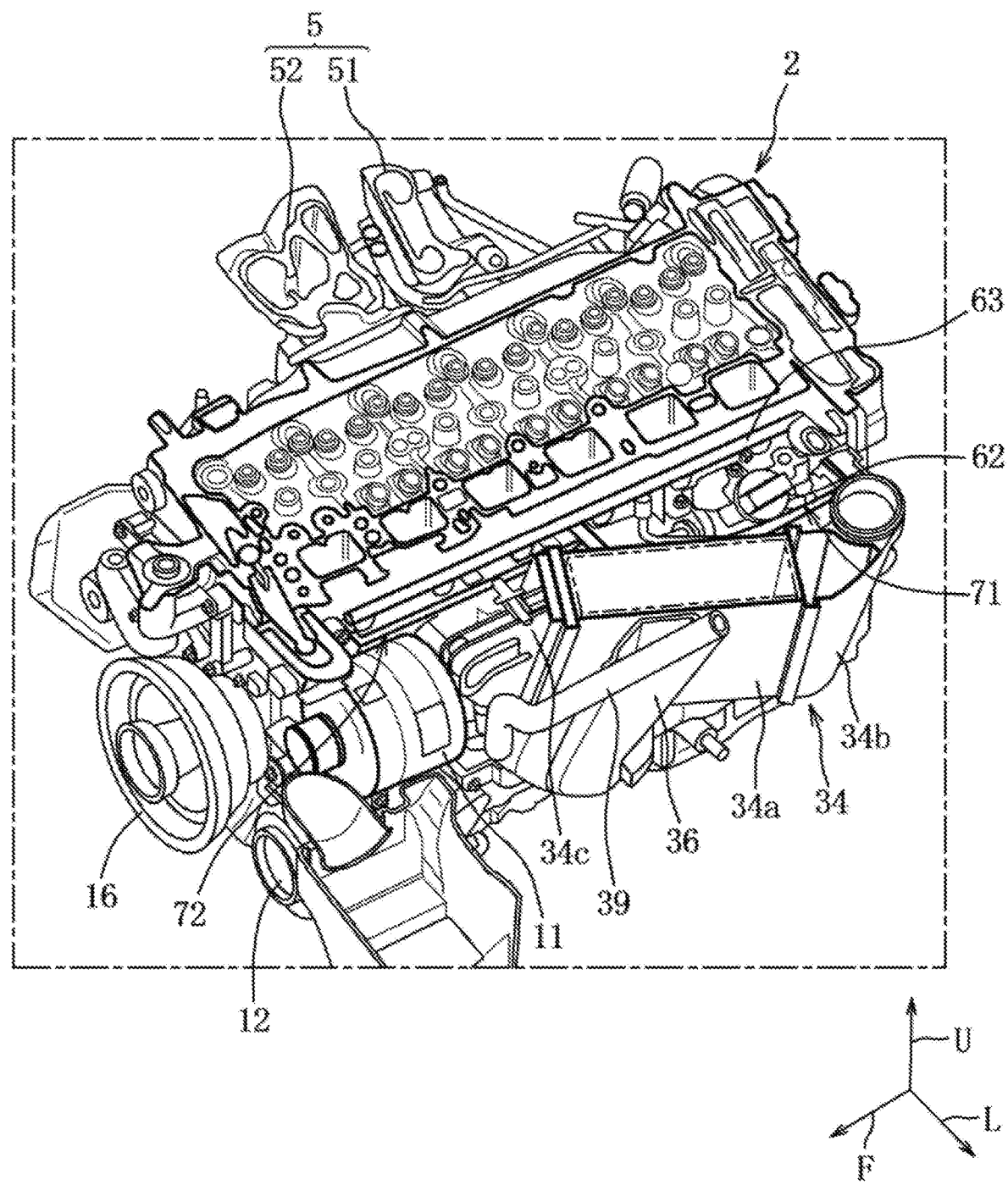
FIG. 4 is a cross-sectional view of the engine.
Figure 5:
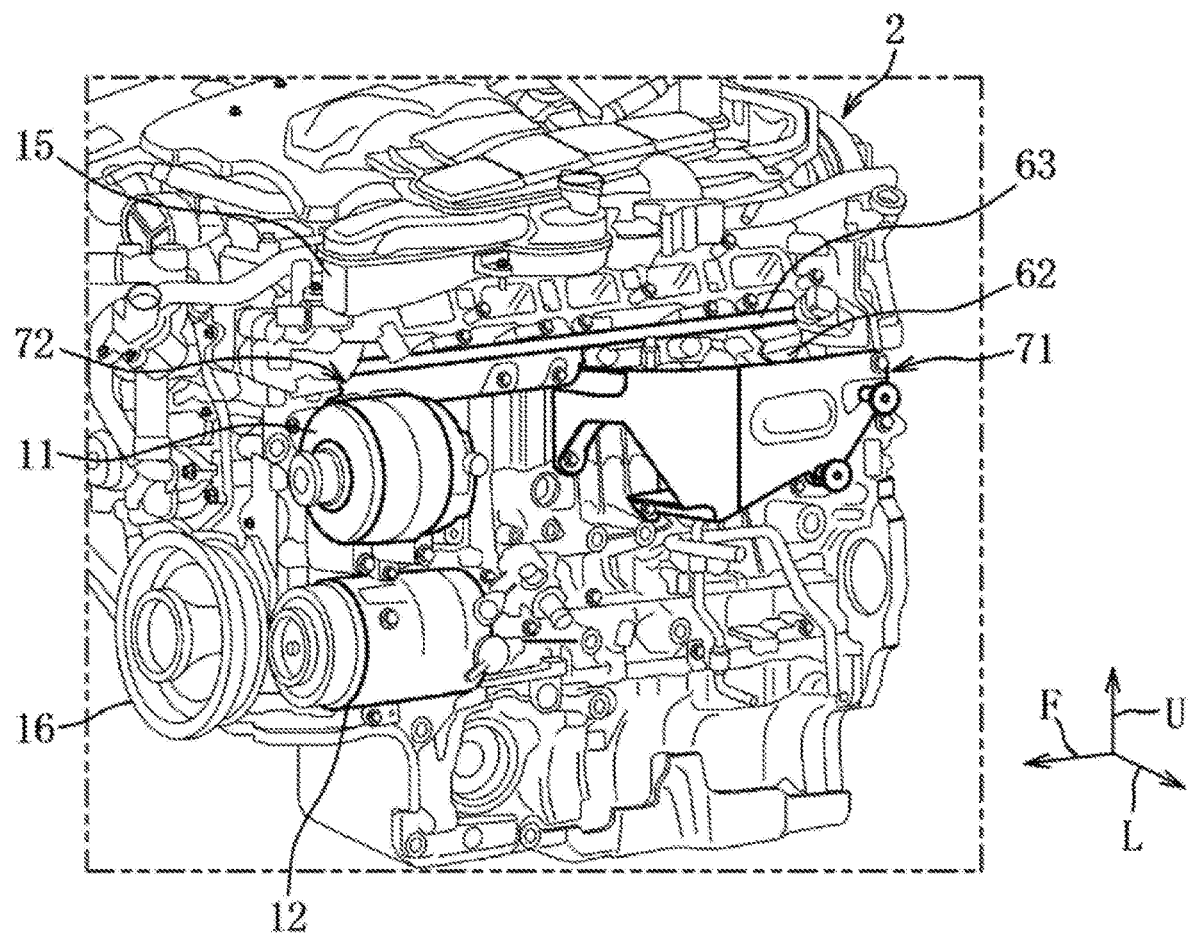
FIG. 5 is a perspective view of the engine from which an intake manifold and an intercooler are omitted.
Figure 6:
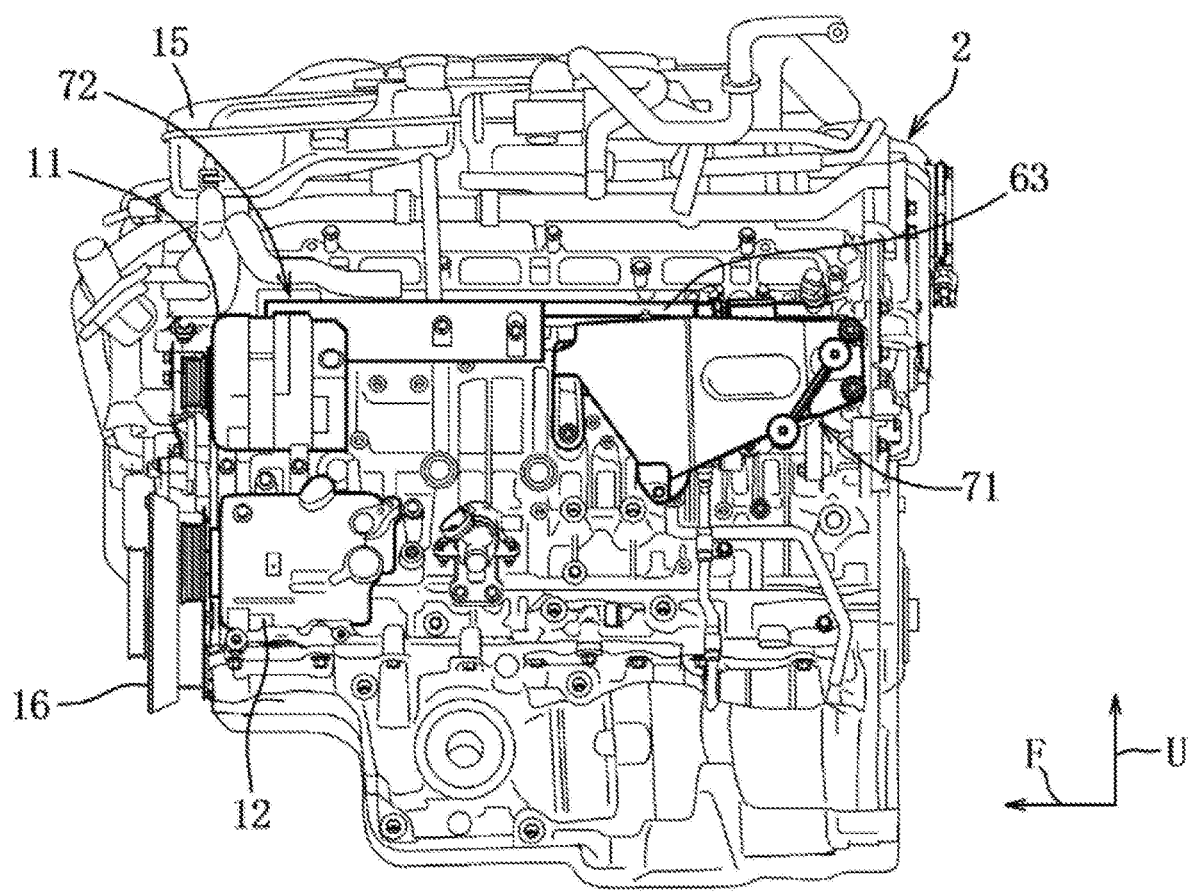
FIG. 6 is a side view of FIG. 5.

Next, the intercooler 34 is described. The intercooler 34 includes a body part 34a, an introduction part 34b provided to a rear end part of the body part 34a, and an exit part 34c provided to a front end part of the body part 34a, and it is fixed to the left side wall part of the engine body 2 through fastening members (not illustrated), such as bolts. As illustrated in FIGS. 3 and 4, the body part 34a is formed in a substantially rectangular parallelepiped shape which is covered by an aluminum plate member, and the body part 34a is disposed so that the largest flat-surface part which is formed by the long sides and the short sides opposes the left side wall part of the engine body 2 and is separated from this left side wall part as it goes rearward. The body part 34a is disposed below the surge tank 35. The yield strength of a core part accommodated in the body part 34a is about 50 kN, for example.

The introduction part 34b made of synthetic resin is provided to the rear end part of the body part 34a, and connects the intake passage 31 with the body part 34a. This introduction part 34b is connected at an upper part of its rear end with the intake passage 31. The exit part 34c made of synthetic resin is provided to the front end part of the body part 34a, and connects the body part 34a with an upstream end part of the communicating part 36. This exit part 34c is connected at a lower part of its front end with the communicating part 36. The communicating part 36 is disposed on the left side of the exit part 34c, and extends substantially linearly in the vertical direction so as to connect a lower part of the left end of the surge tank 35 with the lower part of the front end of the exit part 34c. Note that the connection between the exit part 34c and the communicating part 36 is structured to be separable when a given force acts thereon.

Figure 8:
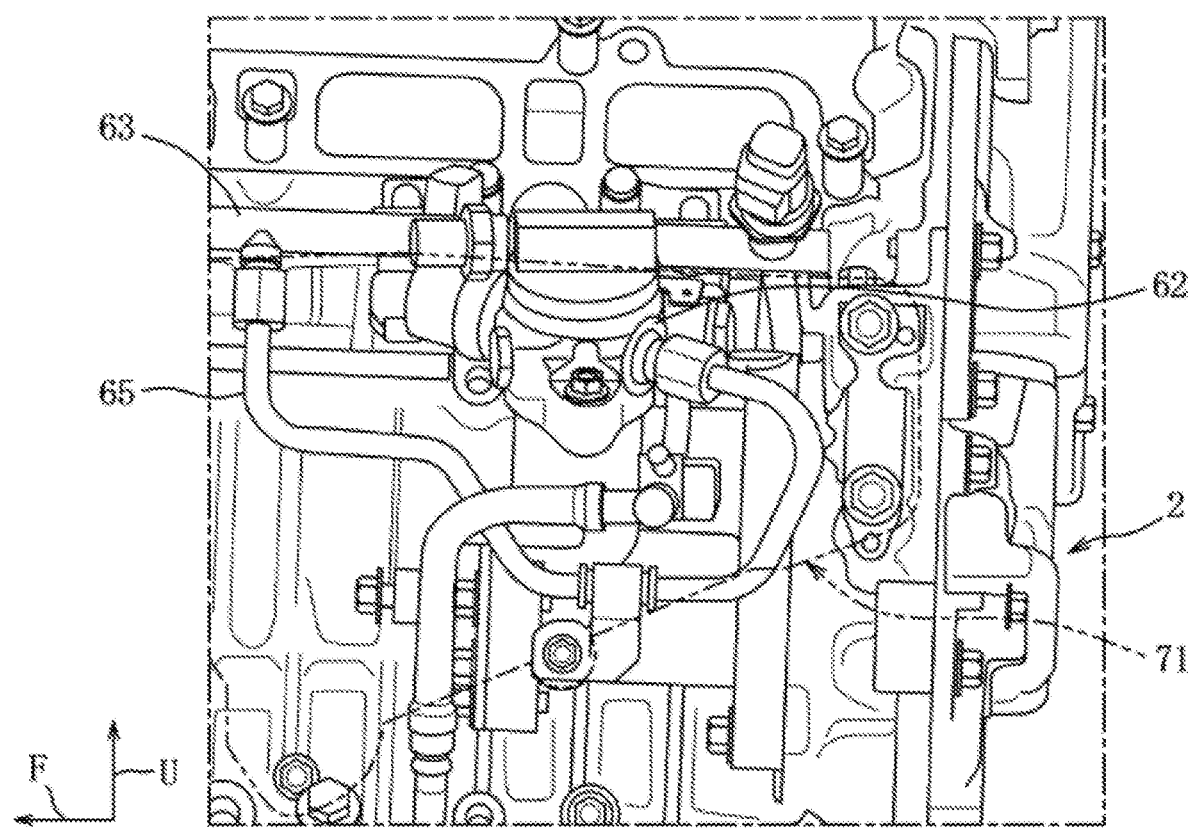
FIG. 8 is an enlarged view of an area near a fuel pump.
Figure 9:
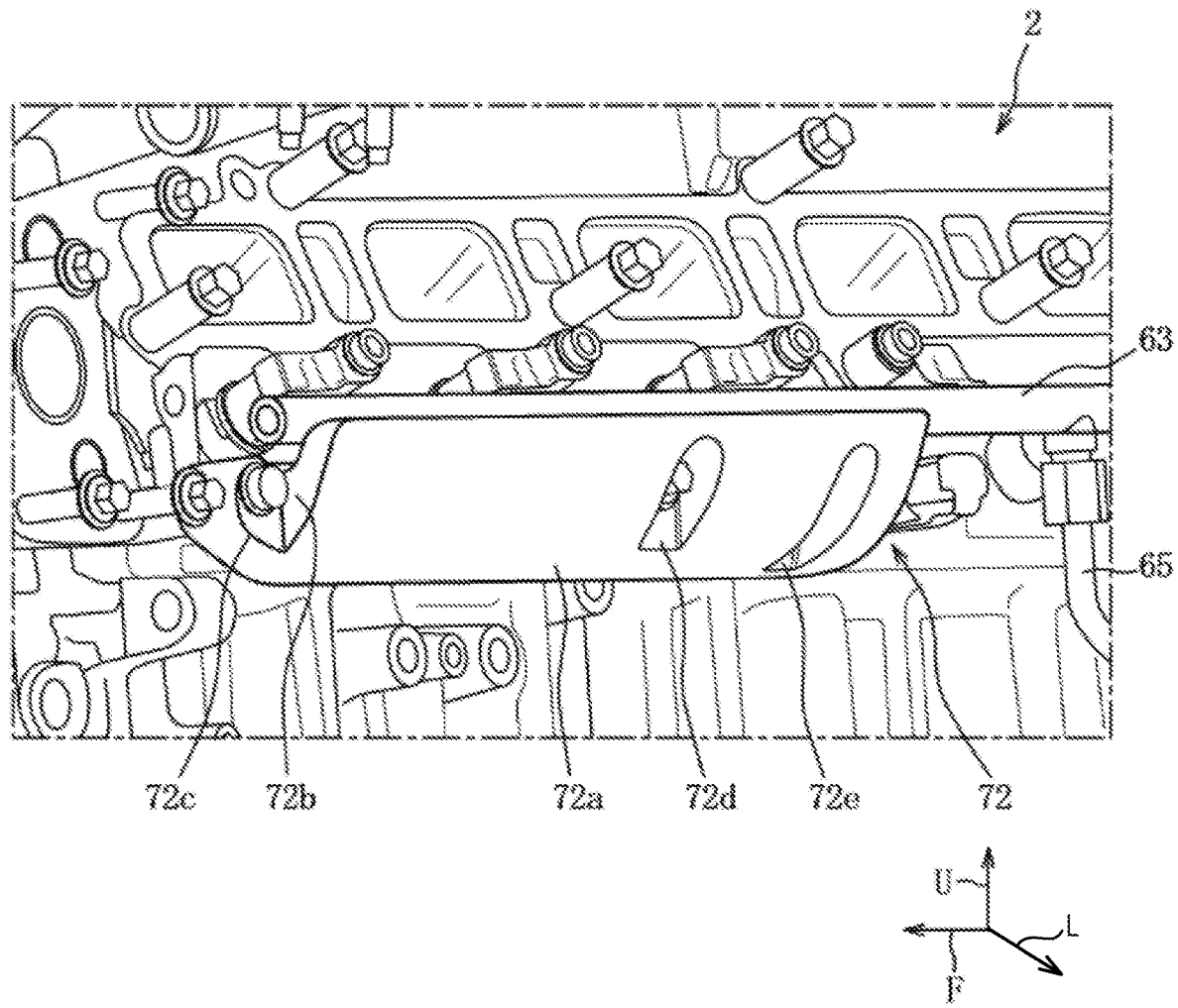
FIG. 9 is an enlarged view of an area near a fuel rail.

Next, the fuel pump 62 and the fuel rail 63 are described. The fuel pump 62 is comprised of a rotatable cam shaft provided with a pump cam, a cam chamber which accommodates the pump cam, a roller which is rotatable while slidably contacting the pump cam, a shoe pressed by the roller and biased by a spring, a plunger which reciprocates vertically synchronizing with the shoe, and a pump chamber formed at a tip-end part of the plunger (none of them is illustrated). As illustrated in FIG. 8, the fuel pump 62 is attached to the left side wall part of the engine body 2 so as to stand upward and leftward, and a body part is constructed by aluminum casting and an upper part is made of stainless steel. The cam shaft of the fuel pump 62 is coupled to and driven by a rear end part of a crankshaft (not illustrated) of the engine body 2 through a chain.

As illustrated in FIGS. 2, 4 to 6, 8, and 9, the fuel rail 63 is disposed below the surge tank 35 and above the intercooler 34 so that it extends substantially linearly in the front-and-rear direction at a location near the left side wall part of the engine body 2. The fuel rail 63 is made of stainless steel, and an intermediate part thereof is connected with a discharge port of the fuel pump 62 through a metal coupling pipe 65. The metal coupling pipe 65 is connected at one end to a lower part of the intermediate part of the fuel rail 63, and the other end is connected to the discharge port formed in a rear upper part of the fuel pump 62.

Next, auxiliary machinery (the alternator 11 and a compressor 12) is described. As illustrated in FIGS. 2, 4 to 7, the alternator 11, and the compressor 12 of an air-conditioner (not illustrated) are fixed to the left side wall part of the engine body 2 through fastening members, such as bolts. The alternator 11 and the compressor 12 are coupled to a crank pulley 16 through a belt member, and are driven by the crankshaft. The compressor 12 is disposed in a lower part of the left side wall part of the engine body 2 and on the left side of the crank pulley 16.

Figure 7:
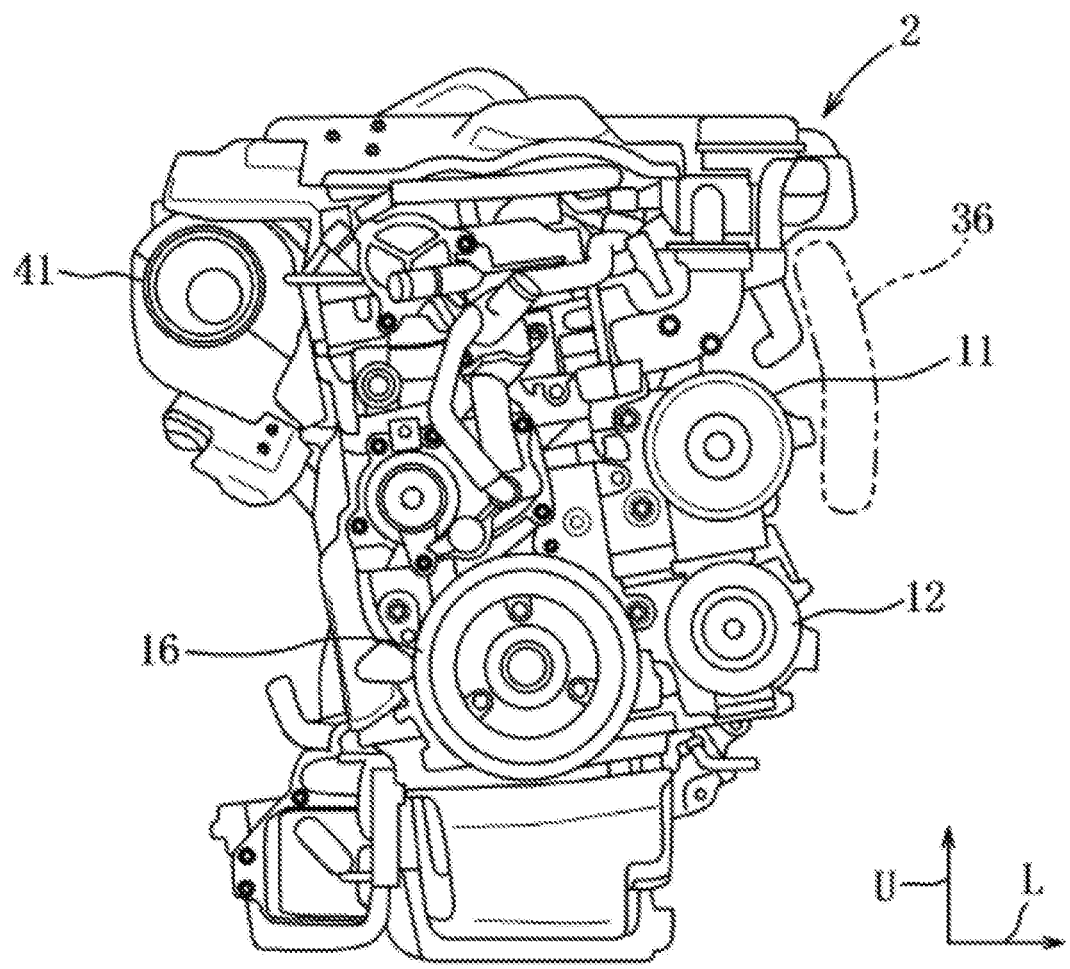
FIG. 7 is a front view of FIG. 5.

The alternator 11 is disposed forward of the intercooler 34 and above the compressor 12. The alternator 11 is comprised of a casing of which the outside is made of an aluminum alloy, and iron coils and permanent magnets are accommodated inside the casing. As illustrated in FIG. 7, the alternator 11 is disposed, in the front view, between the left side wall part of the engine body 2 and the communicating part 36 so that it partially overlaps with the fuel pump 62.

Therefore, the alternator 11 is constructed movably to the rear while avoiding interfering with the communicating part 36, in a vehicle collision.

Next, the first protector 71 is described. As illustrated in FIGS. 2, 4 to 6 and 8, the first protector 71 is formed by aluminum casting, and is disposed between the intercooler 34 (body part 34a) and the fuel pump 62. Therefore, the alternator 11, the intercooler 34, the first protector 71, and the fuel pump 62 are located at substantially the same left-and-right location in the front view and at substantially the same height in the side view.

Figure 10:
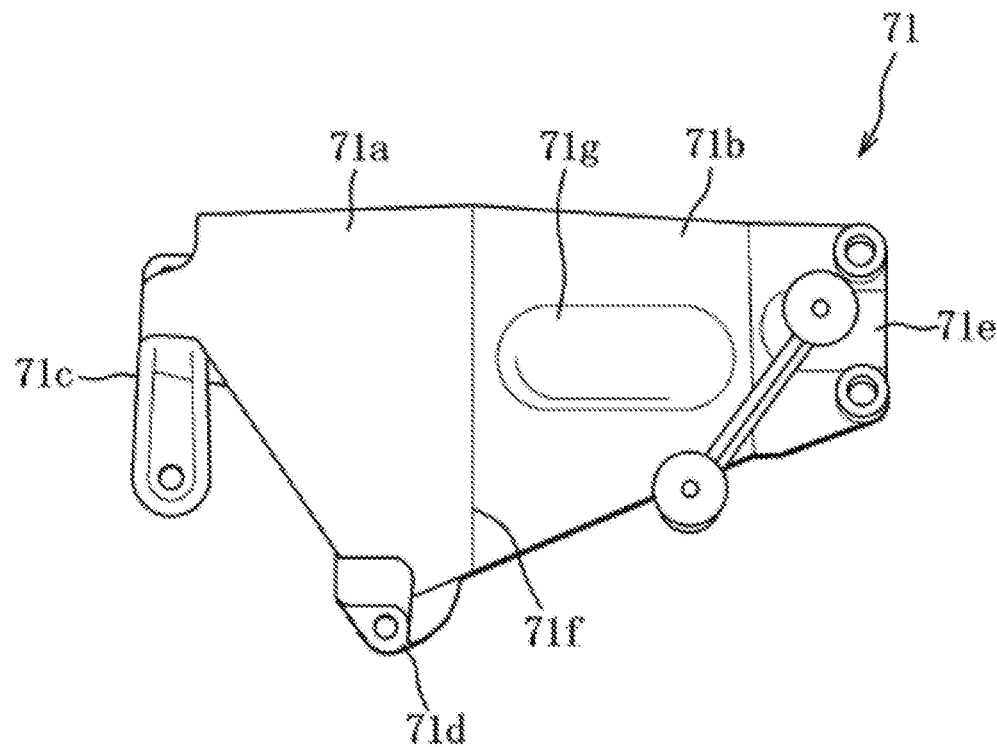
FIG. 10 is a side view of a first protector.
Figure 11:
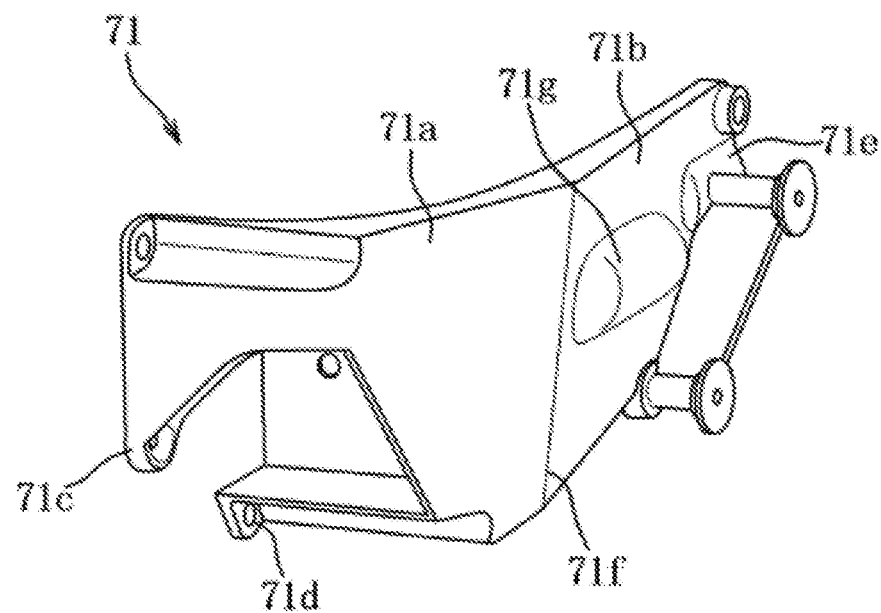
FIG. 11 is a perspective view of the first protector.

As illustrated in FIGS. 10 and 11, the first protector 71 is comprised of an inclined part 71a, and a side wall part 71b which continues to the rear side of the inclined part 71a through a bend part 71f, which are formed integrally. When the first protector 71 is fixed to the engine body 2, the inclined part 71a inclines so as to separate from the left side wall part of the engine body 2 as it goes rearward. An angle of inclination of the inclined part 71a is set so that the inclined part 71a becomes substantially become parallel to the largest flat-surface part of the intercooler 34. A front leg part 71c extending rightward is formed in a front end part of the inclined part 71a, and a tip-end part of the front leg part 71c is fixed to the left side wall part of the engine body 2 through a plurality of (e.g., two, upper and lower) fastening members. A lower leg part 71d extending rightward is formed in a bottom end part of the inclined part 71a, and a tip-end part of the lower leg part 71d is fixed to the left side wall part of the engine body 2 through a fastening member.

The side wall part 71b is disposed substantially perpendicular to the left-and-right direction. The bend part 71f extending vertically is formed at substantially the center location of the first protector 71 in the front-and-rear direction, and is disposed forward of the fuel pump 62 in the side view. A rear fixed part 71e is formed in a rear end part of the side wall part 71b, and is fixed to the left side wall part of the engine body 2 through a plurality of (e.g., two, upper and lower) fastening members. A bulged part 71g dented rightward is formed in a center part of the side wall part 71b. The bulged part 71g avoids the interference of an upper part of the fuel pump 62 with the side wall part 71b.

Next, the second protector 72 is described. As illustrated in FIGS. 2, 4 to 6, and 9, the second protector 72 is constructed by aluminum casting, and is disposed between the intercooler 34 and the alternator 11, and the fuel rail 63. The second protector 72 is formed so as to partially protect a lower and front part of the fuel rail 63. In detail, a front part of the second protector 72 extends forward of the front end part of the fuel rail 63, its rear part extends rearward of a corner part of the intercooler 34 which is closest to the left side wall part of the engine body 2 (a front short side part of a right flat-surface part of the intercooler 34).

Figure 12:
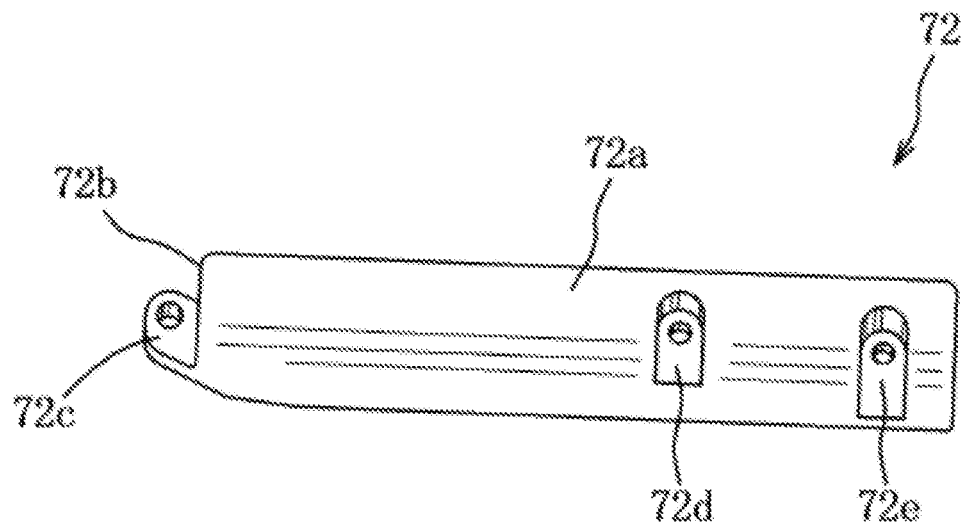
FIG. 12 is a side view of a second protector.
Figure 13:
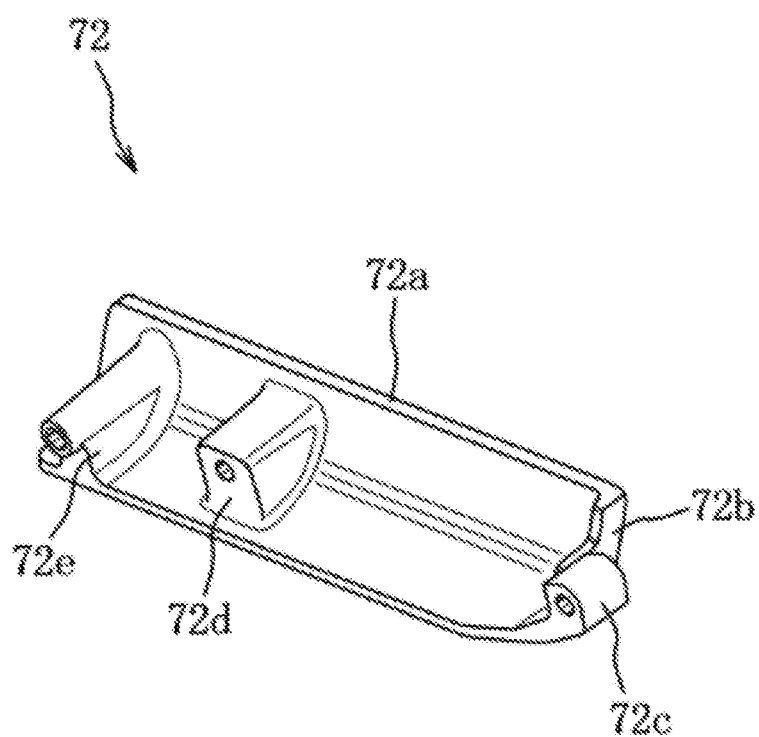
FIG. 13 is a perspective view of the second protector.

As illustrated in FIGS. 12 and 13, the second protector 72 is comprised of a body part 72a and a front wall part 72b (front-end protecting part) which are formed integrally. The body part 72a is formed in a substantially C-shape in the front view, and covers a lower part and a left part of the first-half part of the fuel rail 63 so as to be separated therefrom by a given interval. An intermediate fixed part 72d is formed in an intermediate part of the body part 72a, a rear fixed part 72e is formed in a rear end part of the body part 72a, and the body part 72a is fixed to the left side wall part of the engine body 2 by these fixed parts 72d and 72e through fastening members. The front wall part 72b is formed in a substantially sector shape, and covers a front end part of the fuel piping 64 so as to be separated therefrom by a given interval. A front fixed part 72c is formed in the front wall part 72b, and it is fixed to the left side wall part of the engine body 2 through a fastening member.

Next, functions of the first and second protectors 71 and 72 are described with reference to FIG. 14. In an offset head-on collision or a head-on pole collision, an obstacle, such as a pole, collides the accessory (auxiliary machinery), such as the alternator 11, fixed to a front end part of the side wall part of the engine body 2, without colliding the engine body 2, and therefore, the accessory may move rearward. When the alternator 11 fixed to the front end part of the side wall part of the engine body 2 moves rearward, the first and second protectors 71 and 72 prevent damage to the fuel system component, such as the fuel pump 62, which is attached to a rear end part of the side wall part of the engine body 2.

Figure 14A:
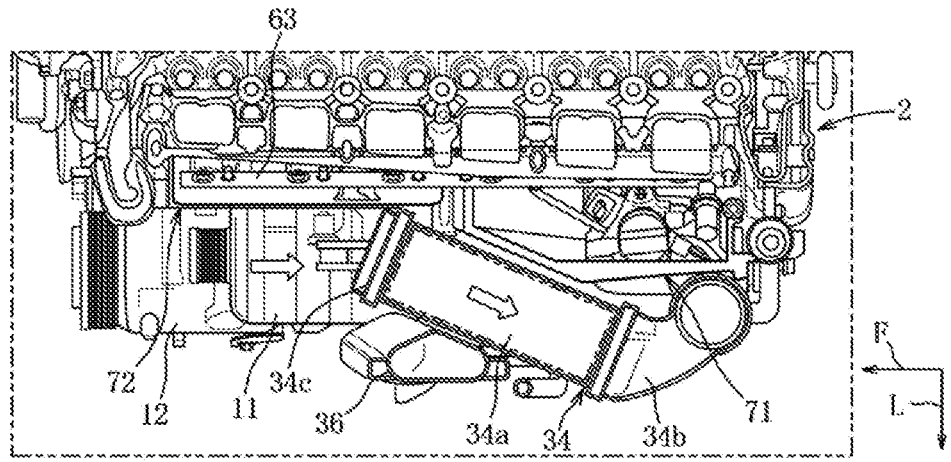
FIGS. 14A to 14C are views illustrating state of an alternator and the intercooler in a vehicle collision, where

As illustrated in FIG. 14A, in an initial stage of the collision, the obstacle enters into the engine bay, and its impact force moves the alternator 11 rearward until the alternator 11 contacts the intercooler 34. When the alternator 11 contacts the intercooler 34, the rearward movement of the alternator 11 ends if the fixing force of the intercooler 34 is larger than the rearward propelling force of the alternator 11. If the fixing force of the intercooler 34 is smaller than the rearward propelling force of the alternator 11, the fixation of the intercooler 34 is canceled and the intercooler 34 then starts moving rearward.

Figure 14B:
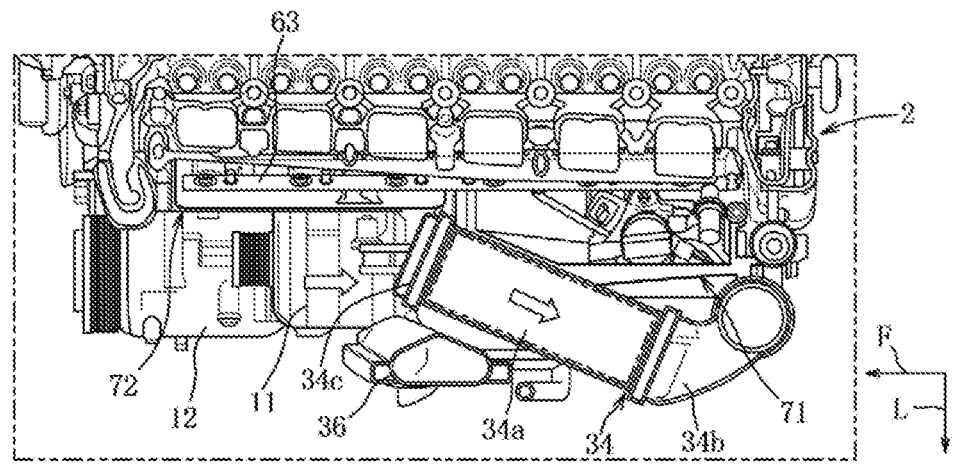

As illustrated in FIG. 14B, in a middle stage of the collision, when the intercooler 34 starts moving rearward, since the connection between the exit part 34c and the communicating part 36 is structured separable, damage to the intake manifold 30 can be avoided by the exit part 34c and the communicating part 36 being separated from each other. Moreover, when the intercooler 34 moves rearward, the intercooler 34 may move in the lateral direction (vehicle width direction). Since the rear part of the second protector 72 extends rearward of the part of the intercooler 34 closest to the left side wall part of the engine body 2, the interference of the corner part of the intercooler 34 (the front short side part of the right flat-surface part of the intercooler 34) with the fuel rail 63 can be prevented, thereby avoiding damage to the fuel rail 63.

Figure 14C:
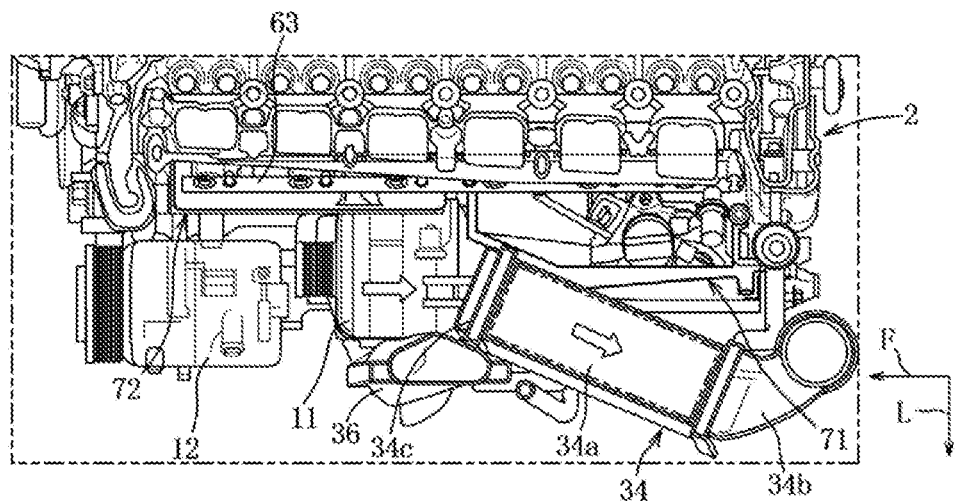

As illustrated in FIG. 14C, in the later period of the collision, if the intercooler 34 further moves rearward, the right flat-surface part of the intercooler 34 contacts the first protector 71, and the intercooler 34 then slides along the inclined part 71a of the first protector 71. Since the inclined part 71a inclines so as to be separated from the left side wall part of the engine body 2 as it goes rearward, the intercooler 34 moves leftward and rearward while avoiding the fuel pump 62. Moreover, since the fuel pump 62 is surrounded by the first protector 71 from the left side, the first-half part of the fuel rail 63 is protected by the second protector 72 from left and below, and the second-half part of the fuel rail 63 is protected by the first protector 71 and the intercooler 34 from left and below, the safety of the fuel pump 62 and the fuel rail 63 during a side collision is also secured.

Next, operation and effects of the side part structure of the engine according to this embodiment of the present disclosure is described. According to this embodiment, since the intercooler 34 is disposed between the alternator 11 and the fuel pump 62, the intercooler 34 can be compactly disposed between the alternator 11 and the fuel pump 62, and the rearward movement of the alternator 11 can be prevented by the intercooler in the vehicle collision. Since the first protector 71 is disposed between the intercooler 34 and the fuel pump 62, at least the front part of the first protector 71 is formed so as to be separated from the side wall part as it goes rearward, and the intercooler 34 is disposed so that its front part is disposed rearward of the alternator 11, and is disposed along the first protector 71 so as to be separated from the side wall part as it goes rearward, the intercooler 34 can be guided leftward so as to be separated from the fuel pump 62 along the inclined part 71a of the first protector 71 when the intercooler 34 moves rearward in connection with the rearward movement of the alternator 11 during the vehicle collision, thereby avoiding the interference of the intercooler 34 with the fuel pump 62.

Since the alternator 11 is disposed so as to at least partially overlap with the fuel pump 62 when seen in the cylinder lined-up direction, the interference of the fuel pump 62 with the alternator 11 and the intercooler 34 can be avoided even if the alternator 11 and the fuel pump 62 are in the spatial relationship in which they at least partially overlap with each other in the front view.

Since the surge tank 35 which can store the intake air of the engine body 2 is disposed above the intercooler 34, the communicating part 36 which communicates a left-side part of the surge tank 35 with the lower part of the intercooler 34 is provided, and the communicating part 36 is disposed so as to pass through the outside on the left side of the alternator 11, the interference of the alternator 11 with the communicating part 36 can be avoided when the alternator 11 moves rearward, thereby avoiding damage to the surge tank 35 resulting from the rearward movement of the alternator 11.

Since the fuel rail 63 extending in the front-and-rear direction along the side wall part of the engine body 2 and the second protector 72 covering at least a part of the fuel rail 63 on the intercooler side are provided, the interference of the fuel rail 63 with the intercooler 34 can be avoided when the intercooler 34 moves rearward.

Since the second protector 72 has the front wall part 72b disposed forward of the front end part of the fuel rail 63, it can avoid damage to the front end part of the fuel rail 63.

Since the rear end part of the second protector 72 extends rearward of the part of the intercooler 34 closest to the side wall part of the engine body 2, it can certainly avoid the interference of the fuel rail 63 with the intercooler 34 when the intercooler 34 moves rearward.

Since the auxiliary machinery is the alternator 11 and the fuel system component is the fuel pump 62, they can avoid both the interference of the alternator 11 with the fuel pump 62 and the interference of the intercooler 34 with the fuel pump 62 in the vehicle collision.

Next, modifications in which the above embodiment is partially changed are described.

(1) Although in the above embodiment the 6-cylinder longitudinal gasoline engine is described, the type, the number of cylinders, the model, and the layout of the engine may be arbitrarily set as long as the engine is at least oriented longitudinally, and, for example, it may be a 4-cylinder diesel engine.

(2) Although in the above embodiment the auxiliary machinery is the alternator and the fuel system component is the fuel pump, the auxiliary machinery may be arbitrarily chosen from auxiliary machinery which is attachable to the side wall part of the engine, such as a starter motor and an air-conditioner compressor, without being limited to the alternator. Moreover, the fuel system component may be arbitrarily chosen from fuel system components which are attachable to the side wall part of the engine, such as a fuel filter, without being limited to the fuel pump. Moreover, although the auxiliary machinery and the fuel system component are disposed in the left side wall part of the engine, similar effects can be obtained even if they are disposed in a right wall part of the engine. Moreover, although the first protector 71 has the inclined part 71a and the side wall part 71b, only the inclined part 71a may be provided and the side wall part 71b may be omitted.

(3) Other embodiments in which various alterations are made to the above embodiment or the above embodiment is combined with the modifications may also be implemented by the person skilled in the art without departing from the spirit of the present disclosure, and therefore, the present disclosure also encompasses such alterations.

DESCRIPTION OF REFERENCE CHARACTERS

1 Engine
2 Engine Body
11 Alternator
34 Intercooler
35 Surge Tank
36 Communicating Part
62 Fuel Pump
63 Fuel Rail
71 First Protector
72 Second Protector

What is claimed is:

1. A side part structure of an engine having cylinders lined up in a front-and-rear direction of a vehicle body, comprising:
   auxiliary machinery disposed in a front part of one side wall part of the engine in a vehicle width direction;
   a fuel system component disposed in a rear part of the side wall part;
   an intercooler disposed between the auxiliary machinery and the fuel system component; and
   a first protector member disposed between the intercooler and the fuel system component,
   wherein at least a front part of the first protector member is formed so as to be separated from the side wall part as it extends rearward, and
   wherein a front part of the intercooler is disposed rearward of the auxiliary machinery and the intercooler is disposed along the first protector member so as to be separated from the side wall part as it extends rearward.

2. The side part structure of claim 1, wherein the auxiliary machinery is disposed so as to at least partially overlap with the fuel system component, when seen in a cylinder lined-up direction.

3. The side part structure of claim 1, further comprising:
   a surge tank provided above the intercooler and configured to store intake air of the engine; and
   a communicating part communicating one side of the surge tank in the vehicle width direction with a lower part of the intercooler,
   wherein the communicating part is disposed so as to pass through outside the auxiliary machinery on the one side in the vehicle width direction.

4. The side part structure of claim 1, further comprising:
   a fuel feeding pipe extending along the side wall part in the front-and-rear direction; and
   a second protector member covering at least a part of the fuel feeding pipe on an intercooler side.

5. The side part structure of claim 4, wherein the second protector member has a front-end protecting part disposed forward of a front end part of the fuel feeding pipe.

6. The side part structure of claim 4 wherein a rear end part of the second protector member extends rearward of a part of the intercooler closest to the side wall part.

7. The side part structure of claim 1, wherein the auxiliary machinery is an alternator and the fuel system component is a fuel pump.

8. The side part structure of claim 2, further comprising:
- a surge tank provided above the intercooler and configured to store intake air of the engine; and
- a communicating part communicating one side of the surge tank in the vehicle width direction with a lower part of the intercooler,
- wherein the communicating part is disposed so as to pass through outside the auxiliary machinery on the one side in the vehicle width direction.

9. The side part structure of claim 8, wherein the auxiliary machinery is an alternator and the fuel system component is a fuel pump.

10. The side part structure of claim 5, wherein the auxiliary machinery is an alternator and the fuel system component is a fuel pump.

11. The side part structure of claim 6, wherein the auxiliary machinery is an alternator and the fuel system component is a fuel pump.

\* \* \* \* \*